United States Patent [19]
Dutton et al.

[11] Patent Number: 5,362,281
[45] Date of Patent: Nov. 8, 1994

[54] TOOTHED POWER TRANSMISSION BELT WITH FABRIC REINFORCEMENT

[75] Inventors: Roger W. Dutton, Milliken; Douglas A. Conley, Littleton, both of Colo.

[73] Assignee: The Gates Rubber Company, Denver, Colo.

[21] Appl. No.: 45,008

[22] Filed: Apr. 8, 1993

[51] Int. Cl.⁵ .................................................. F16G 1/28
[52] U.S. Cl. ................................. 474/205; 474/260; 474/261; 474/267
[58] Field of Search ............. 474/204, 205, 249, 250, 474/252, 260, 265–268

[56] References Cited

U.S. PATENT DOCUMENTS

| | | | |
|---|---|---|---|
| 2,067,647 | 1/1937 | Potts | 474/249 |
| 2,983,304 | 5/1961 | Rasero | 474/267 |
| 3,000,771 | 9/1961 | Runton | 474/267 X |
| 3,621,727 | 11/1971 | Cicognani | 474/205 |
| 3,835,720 | 9/1974 | Fisher et al. | 474/250 |
| 3,937,094 | 2/1976 | Cicognani | 74/231 |
| 4,083,261 | 4/1978 | Speer et al. | 474/268 X |
| 4,109,543 | 8/1978 | Foti | 474/268 X |
| 4,150,581 | 4/1979 | Walters | 474/268 X |
| 4,302,197 | 11/1981 | Kimura et al. | 474/267 |
| 4,392,842 | 7/1983 | Skura et al. | 474/205 |
| 4,407,333 | 10/1983 | Fowkes | 474/267 X |
| 4,445,879 | 5/1984 | Cicognani | 474/205 |
| 4,632,665 | 12/1986 | Skura | 474/205 |
| 4,826,472 | 5/1989 | Sato et al. | 474/202 |
| 5,120,280 | 6/1992 | Mizuno et al. | 474/260 |
| 5,178,586 | 1/1993 | Mizuno et al. | 474/266 |

FOREIGN PATENT DOCUMENTS

| | | | |
|---|---|---|---|
| 65644 | 4/1984 | Japan | 474/205 |
| 171990 | 9/1922 | United Kingdom | 474/267 |
| 962956 | 7/1964 | United Kingdom | 474/205 |
| 1265426 | 10/1986 | U.S.S.R. | 474/205 |

Primary Examiner—Ramon S. Britts
Assistant Examiner—Roger J. Schoeppel
Attorney, Agent, or Firm—H. W. Oberg; C. H. Castleman; S. G. Austin

[57] ABSTRACT

A toothed belt with a plurality of teeth along one surface of the belt which surface includes a peripheral wear-resistant fabric that is double woven with two sets of warp yarns and two sets of weft yarns that are tied together in a single layer.

14 Claims, 1 Drawing Sheet

U.S. Patent
Nov. 8, 1994
5,362,281
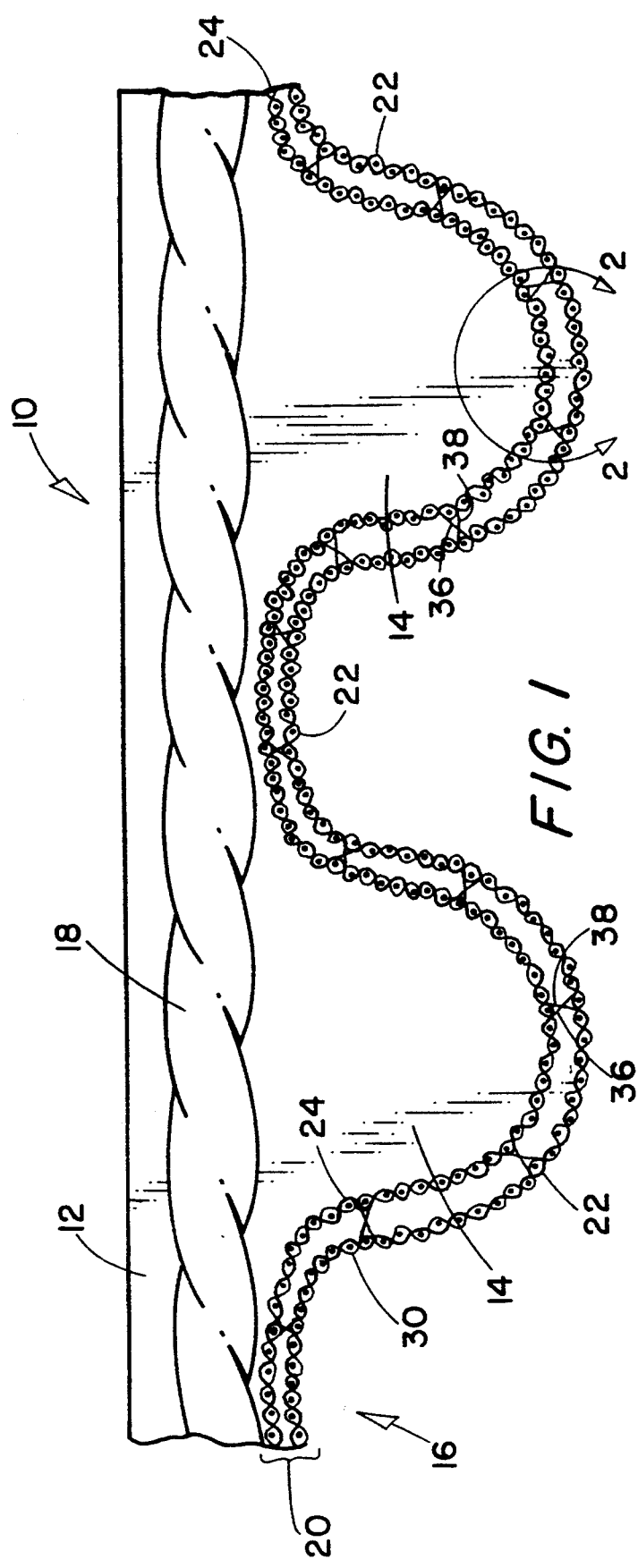
FIG. 1
FIG. 2
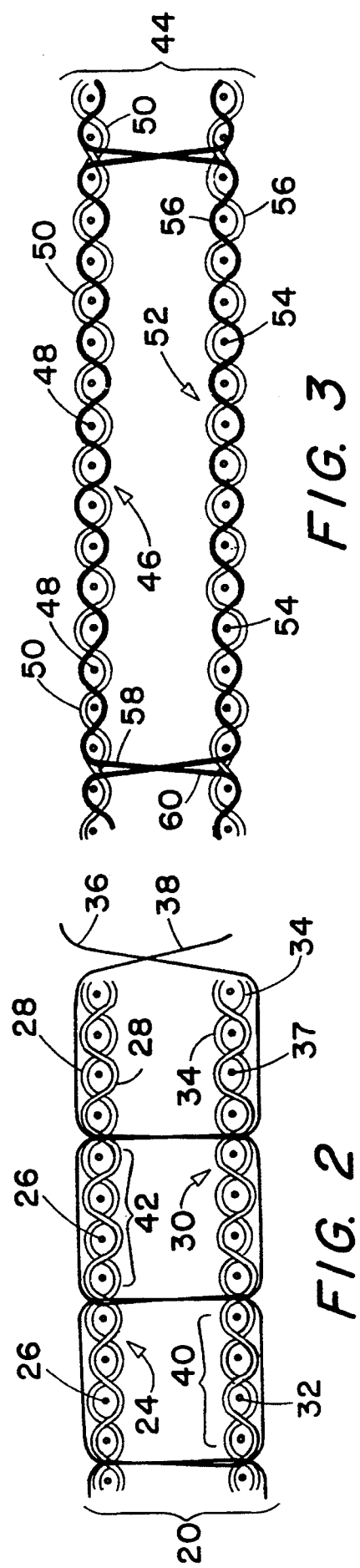
FIG. 3

TOOTHED POWER TRANSMISSION BELT WITH FABRIC REINFORCEMENT

BACKGROUND OF THE INVENTION

The invention relates to a toothed power transmission belt, but more particularly, the invention relates to a fabric reinforcement associated with the teeth of such a belt.

Power transmission belts have a polymeric body with a plurality of teeth along at least one surface of the belt. Many such belts have a tensile member embedded in the body as a load carrying member, and a wear resistant fabric at the periphery of the surface that includes the belt teeth for reinforcing such teeth and inhibiting wear. The type of wear resistant fabric has an impact on the load carrying capacity of the belt teeth, and consequently, the belt itself.

U.S. Pat. No. 3,937,094 and U.S. Pat. No. 4,099,422 each disclose a toothed power transmission belt with trapezoidal belt teeth. The peripheral surface of the belt including the teeth, have two layers of fabric which provide a wear resistant surface to the teeth and structural reinforcement to the teeth. A problem during belt use with such a construction, is delamination of the two layers of fabric which are adhered together such as by means of a cement or a rubber layer. Another problem associated with the construction is that the two layers of fabric and the adhesive mechanism to preclude the fabrics from separating from each other, are a cost penalty in the manufacture of such a belt.

U.S. Pat. No. 4,392,842 discloses a toothed power transmission belt with rounded teeth formed at a surface of the belt. There are two layers of fabric adjacent the surface that includes the belt teeth. The fabrics are separated from each other with a cushion layer of elastomeric material so as to decrease the rigidity of the belt teeth in comparison to the previously mentioned two layer fabric constructions. While such a construction may be beneficial for a rounded toothed belt, the two layers of fabric, their spacing, and adhesion system for the fabric layers adds to the manufacturing steps and costs for producing such a belt.

U.S. Pat. No. 4,302,197 discloses a toothed power transmission belt with a single layer of fabric at the peripheral surface including the belt teeth where the fabric is constructed such that its outside has fiber with properties for abrasion resistance and the inside has fiber with properties for adhesion with the polymeric body of the belt. While such a fabric construction is beneficial for abrasion resistance and adhesion properties, it does not provide the tooth reinforcement exhibited by a belt construction with two layers of fabric of the previously mentioned belts.

SUMMARY OF THE INVENTION

In accordance with the invention, a toothed power transmission belt is provided and is of the type with a polymeric body and a plurality of spaced teeth along at least one surface of the belt. The belt includes an embedded tensile member and a wear resistant fabric disposed at a periphery of the surface that includes the belt teeth. The wear resistant fabric is a single layer of fabric that is woven with at least two sets of warp yarns and two sets of weft yarns defining two integral layers. The two layers are periodically tied together during the weaving process with interlacing yarns so as to form a single fabric.

An object of the invention is to provide a belt construction with a single wear resistant fabric that exhibits the properties of multiple fabrics in terms of tooth reinforcement and, exhibits the simplicity in manufacture and cost associated with manufacture a belt a single-ply, wear resistant fabric.

Another object of the invention is to provide a belt construction with a single wear resistant fabric where the belt exhibits improved horsepower load carrying capabilities over belt constructions with single-ply fabric of the prior art.

These and other objects and advantages of the invention will be apparent after reviewing the drawings and detailed description thereof wherein:

FIG. 1 is an enlarged fragmentary, longitudinal view of a side of a toothed belt of the invention;

FIG. 2 is an enlarged schematical view of fabric taken along line 2—2 of FIG. 1;

FIG. 3 is a view similar to that of FIG. 2 but showing an alternate form of fabric.

DESCRIPTION OF PREFERRED EMBODIMENT

Referring to FIG. 1, a toothed power transmission belt 10 of the invention has a polymeric body 12, a plurality of spaced teeth 14 along at least one surface 16 for engagement with a toothed pulley (not shown), and a wear resistant fabric 20 disposed at a periphery 22 of the surface 16 which includes the belt teeth 14.

The polymeric body may be of any desired material which include, by way of example, natural rubbers, synthetic rubbers, and blends thereof; urethanes such as of the liquid cast or millable gum variety; and thermoplastics such as polyester. The embedded tensile member is of the endless type such as spirally wound cord and is made from a material with minimum elongation such as fiberglass and aramid. The profile of the belt teeth may be of any desired configuration such as trapezoidal, or with curvilinear flank surfaces such as shown in U.S. Pat. Nos. 3,756,091 Miller, 4,605,389 Westhoff, 4,515,577 Cathey, et al. The belt tooth profile of FIG. 1 is of the curvilinear type.

Referring more particularly to FIG. 2, the wear resistant fabric 20 is a single fabric of a multi weave type such as the double weave as shown with two sets of warp and weft yarns wherein a first woven layer 24 has a plurality of warp yarns 26 and a plurality of fill or weft yarns 28. A second fabric layer 30 has a plurality of warp yarns 32 and weft yarns 34. The woven fabric layers 24, 26, are periodically interlaced with tie yarns 36, 38, as fill or weft yarns. Optionally, the tie yarns can be either weft or warp yarns to achieve the desired fiber characteristics. As single fill yarns, they are pick yarns that interlace a group of each set 40, 42, of warp and weft yarns of each fabric. As illustrated in FIG. 2, each group includes four warp yarn ends but a periodic frequency determinative of yarn ends interlaced, may be changed to include any multiple of yarn ends where the periodic frequency is sufficient to adequately and mechanically hold the two woven fabrics together into a single fabric 20.

As shown in conjunction with FIG. 1, the first woven fabric layer 24 faces the belt body 12 forming an inner or backside layer while the second woven fabric layer 30 is at the outside surface of the belt.

Each layer may be woven with yarns suitable for its location within the belt. For example, the first layer 24 may be woven with yarns that enhance adhesion with the belt body while the second or outer fabric layer may be woven with yarns that enhance wear resistance properties in relationship to a belt being used in conjunction with a toothed pulley. There is a variety of combinations that can be used with the two sets of warp and weft yarns of the two fabric layers. A different number of yarn ends may be used in the fabrics so the first layer in comparison to the second layer; and different tenacity yarns, denier, and the like may, be used for each of the two layers. For example, a high tenacity fabric such as disclosed in U.S. Pat. No. 4,826,472 may be used in the outer woven fabric layer while a more conventional fabric may be used as the fabric of the inner layer. Generally speaking, a high tenacity fabric is characterized with a tenacity of 5.0 gm/d'tex or greater whereas a low tenacity fabric has a tenacity of something less than 5.0 gm/d'tex.

Different types of weaves may be used for each of the fabrics such as a square woven fabric, twill, sateen or basket weave. The difference in the fabrics may define an inside or backside of the fabric that is more open than the face side of the fabric such as for example where the backside fabric has from about 60 percent to less than 100 percent of the fabric weight as the outside woven fabric layer.

As known in the art, fabrics are chemically treated to enhance chemical bonding with a polymer from which a belt is made. In rubber type belts, such an adhesive system may be chloroprene rubber cement in combination with RFL (resorcinol formaldehyde latex). Treatment of a fabric enhances the bond between the two woven fabric layers by creating a chemical bond in addition to the mechanical bond formed by the tie yarns. A special adhesive treatment and layering with rubber are not needed as required by prior art double fabric constructions.

Referring to FIG. 3, an alternate form of wear resistant fabric 44 is disclosed. However, the construction is very similar to that of FIG. 2 except for the manner of interlacing the two fabric layers with tie yarns. The fabric 44 includes a first woven fabric layer 46 that has a plurality of warp yarns 48 and a plurality of weft yarns 50. Similarly, the second woven fabric has a plurality of warp yarns 54 and weft yarns 56. Some of the weft yarns of each layer form tie yarns 58, 60. The frequency or period of tieing the two layers of fabric layers together with the yarns may be as desired as long as it forms an acceptable yarn combination in the weaving process. As illustrated in FIG. 3, a group of fifteen warp yarns of each layer tied with the weft yarns 58, 60.

To illustrate the advantages of the features of the invention, 14 mm pitch, round toothed, belts of the invention were tested against similar prior art belts constructed in a similar manner except for the wear-resistant fabric. The prior art belts had a single ply of 0.044 ga wear resistant nylon fabric. The belts of the invention had a single ply of fabric characterized by the following:

| Double Woven Fabric | |
|---|---|
| fiber | nylon |
| weave | 2 × 2 twill double |
| First Layer | |
| warp denier | 940 × 1, Dtex |
| weft denier | 78 × 6, Dtex |
| Second Layer | |
| warp denier | 940 × 1, Dtex |
| weft denier | 110 × 6, Dtex |
| Tie Yarns | |
| 1 yarn tie per 16 warps | 110 × 6, and 78 × 6, Dtex |
| Test Results | |
| Conditions: | |
| 35 hp | |
| 28 tooth sprockets | |
| $T_1 + T_2 =$ | 312 lbs where $T_1$ and $T_2$ are span tensions |
| Load life, this invention | 2473 hrs. (3 belt avg.) |
| Load life, prior art | 586 hrs. (3 belt avg.) |

Thus, the belt of the invention displayed a load life that was over four times better than the compared prior art belt.

What is claimed is:

1. In a toothed power transmission belt of the type with a polymeric body with a plurality of spaced teeth along at least one surface of the belt, an embedded tensile member and a wear resistant fabric reinforcement disposed at a periphery of the surface including the belt teeth, the improvement comprising:

the wear resistant fabric comprising a multi weave fabric with at least a first woven fabric layer having a first plurality of warp and weft yarns and a second woven fabric layer with a second plurality of warp and weft yarns and wherein tie yarns periodically interlace warp yarns of the adjacent fabric layer tieing the two fabric layers together into a single fabric.

2. The power transmission belt as claimed in claim 1, wherein the tie yarns are pick yarns.

3. The power transmission belt as claimed in claim 1, wherein the tie yarns comprise weft yarns of each fabric layer.

4. The power transmission belt as claimed in claim 1, wherein the yarns of each fabric layer have substantially the same tenacity.

5. The power transmission belt as claimed in claim 4, wherein the weft yarns periodic interlace a group of the warp yarns.

6. The power transmission belt as claimed in claim 1, wherein the periodic interlace of the weft with warp yarns is sufficient to preclude delamination of the fabric during belt use.

7. The power transmission belt as claimed in claim 1, wherein the yarns of one fabric layer have a greater tenacity than yarns of the other fabric layer.

8. The power transmission belt as claimed in claim 7, wherein the warp yarns have a higher tenacity than the weft yarns.

9. The power transmission belt as claimed in claim 1, wherein the wear resistant fabric is treated with a chemical adhesion means for chemically adhering the first and second layers together.

10. The power transmission belt claimed in claim 9, wherein the weight of one fabric layer is from about 60 percent to less than 100 percent of the weight of the other fabric layer.

11. The power transmission belt as claimed in claim 1, wherein the weight of one fabric layer is less than the other fabric layer.

12. The power transmission belt as claimed in claim 1, wherein the first and second layers are of a twill weave.

13. The power transmission belt as claimed in claim 12, wherein the lighter weight fabric defines a back surface that faces the elastomeric body.

14. The power transmission belt as claimed in claim 1, wherein a warp yarn count of one fabric layer is different than a warp yarn count of the other fabric layer.

* * * * *